(12) United States Patent
Velmurugan et al.

(10) Patent No.: US 10,698,864 B2
(45) Date of Patent: Jun. 30, 2020

(54) AUXILIARY MANIFEST FILE TO PROVIDE TIMED METADATA

(71) Applicant: Philo, Inc., San Francisco, CA (US)

(72) Inventors: Satheesh Velmurugan, Mountain View, CA (US); Thane Frivold, Redwood City, CA (US); Seth Madison, San Francisco, CA (US); Aleksey Pesterev, San Francisco, CA (US); David Michael Thompson, Stow, MA (US); Benjamin Avery Chambers, San Francisco, CA (US)

(73) Assignee: PHILO, INC., San Francisco, CA (US)

( * ) Notice: Subject to any disclaimer, the term of this patent is extended or adjusted under 35 U.S.C. 154(b) by 0 days.

(21) Appl. No.: 16/190,028

(22) Filed: Nov. 13, 2018

(65) Prior Publication Data

US 2019/0146951 A1 May 16, 2019

Related U.S. Application Data

(60) Provisional application No. 62/585,530, filed on Nov. 13, 2017.

(51) Int. Cl.
*G06F 16/483* (2019.01)
*G06F 16/16* (2019.01)
(Continued)

(52) U.S. Cl.
CPC .......... *G06F 16/164* (2019.01); *G06F 16/432* (2019.01); *G06F 16/483* (2019.01); *G06F 16/489* (2019.01); *H04L 65/4084* (2013.01); *H04L 67/02* (2013.01); *H04N 21/4884* (2013.01); *H04N 21/6332* (2013.01); *H04N 21/64322* (2013.01); *H04N 21/812* (2013.01); *H04N 21/8133* (2013.01); *H04N 21/8153* (2013.01); *H04N 21/84* (2013.01); *H04N 21/8456* (2013.01)

(58) Field of Classification Search
USPC .......................................... 707/822; 709/219
See application file for complete search history.

(56) References Cited

U.S. PATENT DOCUMENTS

| 2015/0074129 A1 | 3/2015 | Friedrich et al. |
| 2015/0207841 A1* | 7/2015 | Drang ............... H04N 21/23439 |
| | | 709/219 |
| 2017/0289639 A1* | 10/2017 | Reisner ................ H04N 21/812 |

OTHER PUBLICATIONS

Unified Streaming, "How containers make Unified Remix easy to customize and quick to deploy," downloaded from https://www.unified-streaming.com/blog/how-containers-make-unified-remix-easy-customize-and-guick-deploy on Oct. 29, 2018, published Feb. 21, 2017, 11 pages.

(Continued)

*Primary Examiner* — Hung T Vy
(74) *Attorney, Agent, or Firm* — Nicholson, De Vos, Webster & Elliott, LLP

(57) ABSTRACT

A method by a media delivery system. The method includes generating a streaming manifest file and an auxiliary manifest file, where the streaming manifest file includes references to video segments of a video content, where the auxiliary manifest file includes timed metadata associated with the video content, and where the streaming manifest file and the auxiliary manifest file refer to a same timeline. The method further includes making the streaming manifest file and the auxiliary manifest file accessible to a client device.

8 Claims, 5 Drawing Sheets

---

Receive a streaming manifest file and an auxiliary manifest file, where the streaming manifest file includes references to video segments of a video content, and where the auxiliary manifest file includes timed metadata associated with the video content, and where the streaming manifest file and the auxiliary manifest file refer to a same timeline (310)

↓

Provide the streaming manifest file to a core playback module of the media player application to play the video content according to the streaming manifest file (320)

↓

Provide custom functionality using the timed metadata included in the auxiliary manifest file that replaces or augments functionality provided by the core playback module (330)

(51) Int. Cl.
*H04N 21/84* (2011.01)
*G06F 16/48* (2019.01)
*H04N 21/845* (2011.01)
*G06F 16/432* (2019.01)
*H04N 21/643* (2011.01)
*H04N 21/6332* (2011.01)
*H04N 21/488* (2011.01)
*H04N 21/81* (2011.01)
*H04L 29/08* (2006.01)
*H04L 29/06* (2006.01)

(56) References Cited

OTHER PUBLICATIONS

Unified Streaming, "How to Make Your Media Streams Smarter Using Timed Metadata," downloaded from http://www.uinified-streaming.com/blog/how-make-your-media-streams-smarter-using-timed-metadata on Oct. 29, 2018, published Oct. 17, 2017, 12 pages.

* cited by examiner

Generate a streaming manifest file and an auxiliary manifest file, where the streaming manifest file includes references to video segments of a video content, where the auxiliary manifest file includes timed metadata associated with the video content, and wherein the streaming manifest file and the auxiliary manifest file refer to a same timeline (210)

Make the streaming manifest file and the auxiliary manifest file accessible to a client device (220)

Fig. 2

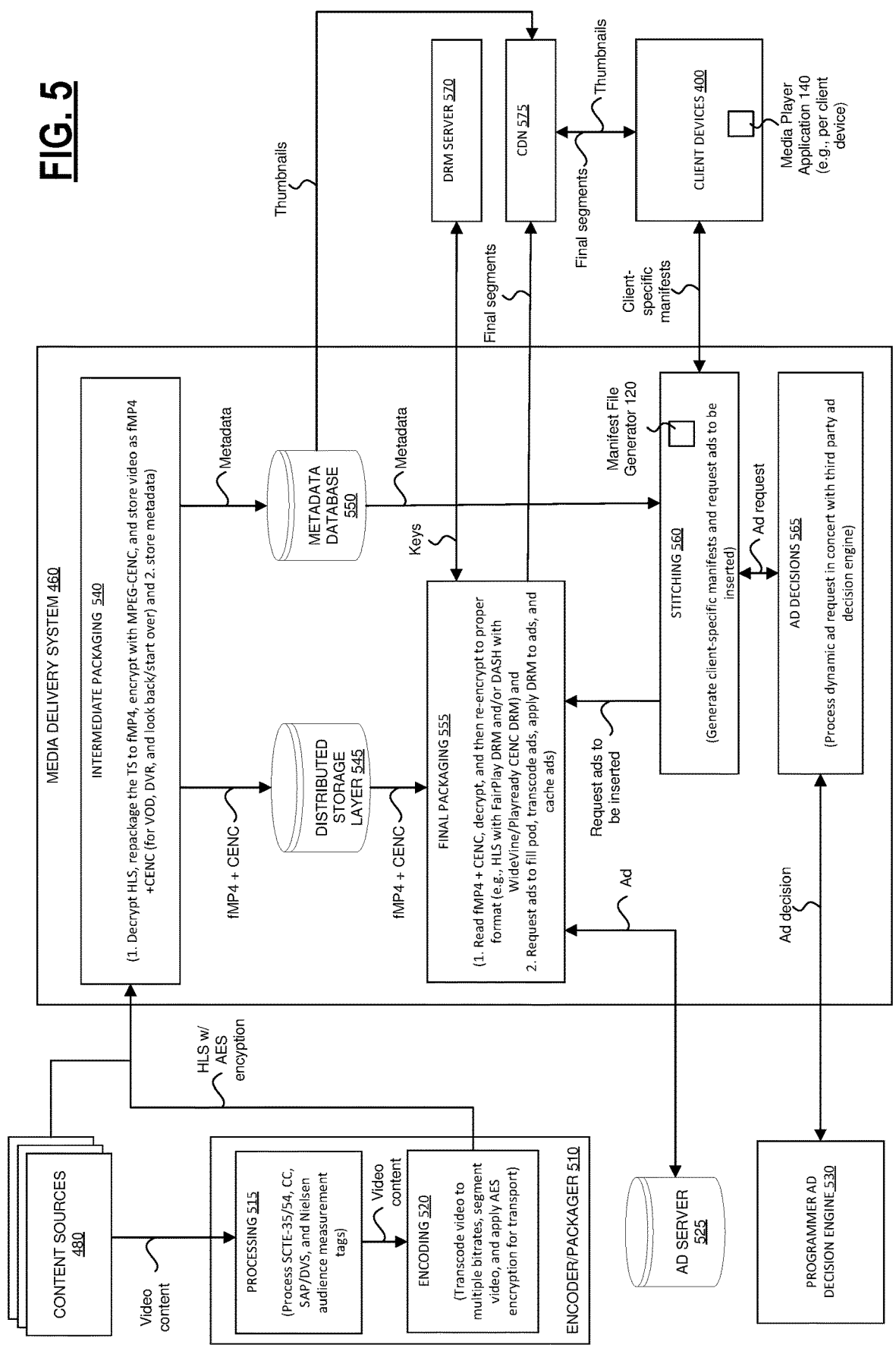

AUXILIARY MANIFEST FILE TO PROVIDE TIMED METADATA

CROSS-REFERENCE TO RELATED APPLICATIONS

This application claims the benefit of U.S. Provisional Application No. 62/585,530, filed Nov. 13, 2017, which is hereby incorporated by reference.

TECHNICAL FIELD

Embodiments relate generally to streaming video, and more specifically to the use of an auxiliary manifest file to provide timed metadata.

BACKGROUND

Streaming video over data networks (e.g., the Internet) has become increasingly popular as the availability of high-bandwidth Internet connections has increased. Video streaming refers to a type of video delivery mechanism where the data for the video is continuously delivered to a client device over a data network (e.g., the Internet) as the user is viewing the video. Video streaming allows a user to start viewing portions of the video without having to first download the entire video.

Pre-recorded video content or live video content can be streamed over the Internet using streaming protocols such as HTTP Live Streaming (HLS) and MPEG Dynamic Adaptive Streaming over HTTP (DASH). Such streaming protocols typically divide video content into a series of video segments and generate a streaming manifest file (also referred to as an index file) that references these video segments. A client device can interpret the streaming manifest file to fetch the video segments and seamlessly assemble the video segments to play the video content.

Timed metadata is used in existing video streaming systems to augment video streams with information that is specific to a particular point in time or a particular time range. This timed metadata can be included in the video segments themselves. However, this means that timed metadata is tied to specific video segments, which does not allow for individualized timed metadata for each playback session. One approach to individualize the timed metadata would be to store multiple copies of the video segments for each playback session, each having its own timed metadata embedded therein. However, this would quickly become untenable in terms of storage requirements as the number of playback sessions increases. Alternatively, with existing streaming protocols, timed metadata can be placed directly into streaming manifest files (e.g., HLS manifest file or DASH manifest file). This requires that the client side be able to properly interpret and process streaming manifest files that include timed metadata. Thus, for each platform, a playback module must be implemented that can properly interpret and process streaming manifest files that include timed metadata to perform video playback and any functions that utilize the timed metadata. Where such a playback module is implemented for a given platform, the way that the playback module uses the timed metadata is up to the entity that implemented the playback module. Where such a playback module is not implemented, any functionality that relies on timed metadata may not be performed.

BRIEF DESCRIPTION OF THE DRAWINGS

Embodiments of the invention may best be understood by referring to the following description and accompanying drawings that are used to illustrate embodiments of the invention. In the drawings:

FIG. 2 is a flow diagram of a server side process, according to some embodiments;

FIG. 5 is a diagram illustrating a video streaming system architecture, according to some embodiments.

DETAILED DESCRIPTION

Figure 1:
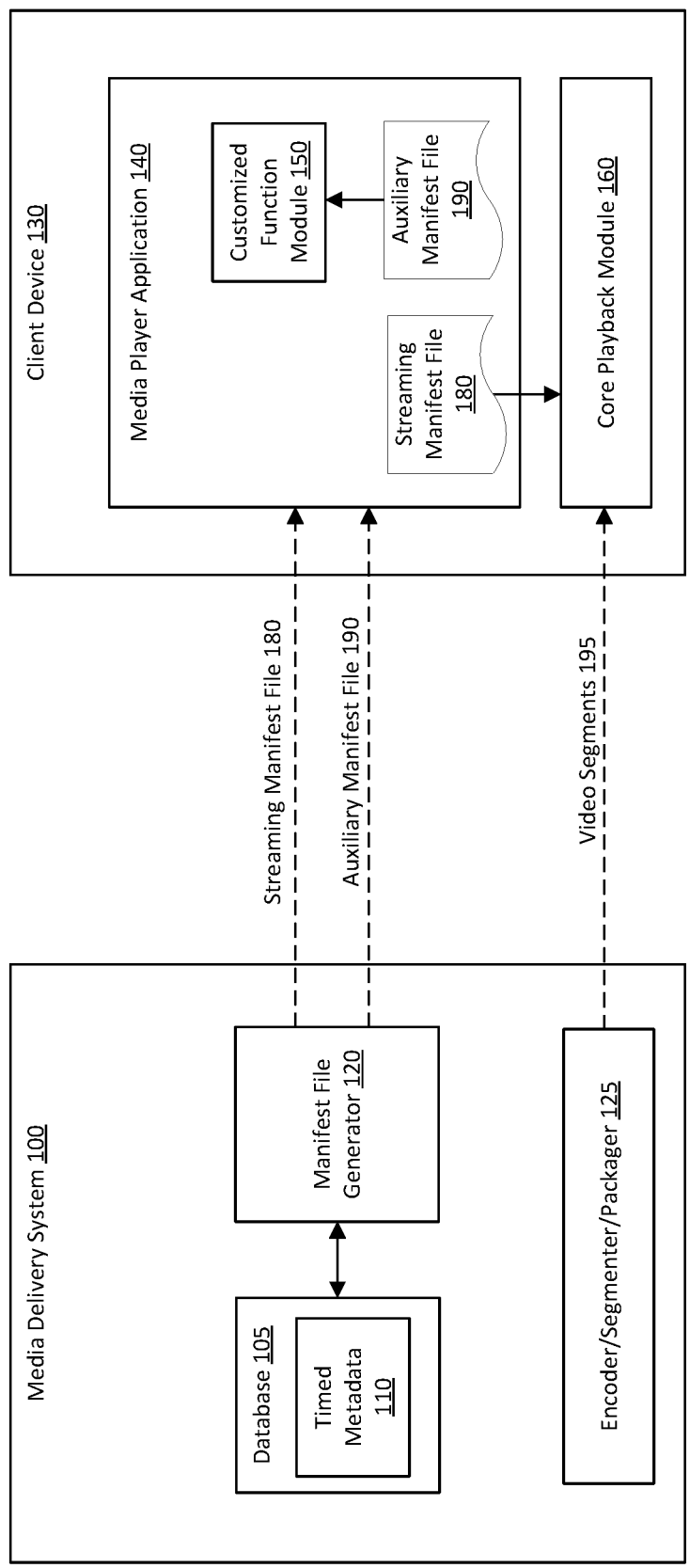
FIG. 1 is a diagram illustrating a video streaming system, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (or computing device) stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

As reflected earlier, an electronic device can take a variety of forms, including a client electronic device (also referred to as a client computing device or client device) that implements a media player application that plays back video streamed over a network. Such a client electronic device may be used by a user and have one or more user input mechanisms, such as a keyboard, touchscreen, remote control, etc. Such client electronic devices may come in a variety of sizes, including relatively large (e.g., a smart TV, a set top box without a screen and intended to be connected to a display (such as a TV), or a desktop computer connected to a display) and relatively small (e.g., a mobile device such as a laptop, smart phone, or smart watch with an integrated (optionally touchscreen) display).

FIG. 1 is a diagram illustrating a video streaming system, according to some embodiments. The system includes a media delivery system 100 and a client device 130. The media delivery system 100 is a system that enables streaming of live and/or on-demand media content to one or more client devices 130. As shown in the diagram, the media delivery system 100 includes an encoder/segmenter/packager 125 that may digitally encode video content ingested by the media delivery system 100 (e.g., at varying bit rates). The encoder/segmenter/packager 125 may then segment the encoded video content into a series of video segments, repackage the video segments into a format suitable for client devices 130, and make the video segments accessible to client devices 130 (e.g., by sending the video segments 195 to the client device 130 or storing the video segments 195 in a content delivery network (CDN) accessible to the client device 130). While the encoder/segmenter/packager 125 is shown in the diagram as a single component, it should be understood that in some embodiment, the functionality of this component can be distributed across separate components (e.g., there could be separate encoder, segmenter, and packager components).

As shown in the diagram, the media delivery system 100 includes a database 105 (e.g., a relational database) for storing timed metadata 110 for video content. As used herein, "timed metadata" refers to metadata that is associated with a specific time or time range within a video content. Examples of timed metadata include thumbnail information (e.g., for thumbnails that can be used to navigate within a video content), ad location information, and other contextual information about the video/audio content (e.g., the actors on screen, information about ads (other than ad location information), closed captions, and/or user-generated content such as user annotations or comments). The timed metadata 110 may have been extracted from the original video content when it was ingested by the media delivery system 100 (e.g., from ad location information specified in the ingested video content), generated separately by the media delivery system 100, and/or generated by users and stored in a database or other storage means as part of the overall media delivery system 100. In one embodiment, each playback session may have its own timed metadata 110, which may be different for different playback sessions.

As shown in the diagram, the media delivery system 100 includes a manifest file generator 120 that is configured to generate a streaming manifest file 180 and one or more auxiliary manifest files 190 for consumption by the client device 130. The streaming manifest file 180 is a manifest file that references video segments 195 of a video content, which can be interpreted by a client device 130 to play the video content. For example, the streaming manifest file 180 could be an HTTP Live Streaming (HLS) manifest file or a MPEG Dynamic Adaptive Streaming over HTTP (DASH) manifest file. An auxiliary manifest file 190 is a manifest file that includes timed metadata associated with video content. For example, an auxiliary manifest file 190 could include timed metadata such as thumbnail information, ad location information, and/or other contextual information about the video/audio content. The streaming manifest file 180 and one or more auxiliary manifest files 190 refer to the same timeline (they refer to the same timing representation—this could be, for example, a presentation timeline where time t=0 is the location corresponding to the beginning of the navigation bar). The manifest file generator 120 may generate the one or more auxiliary manifest files 190 based, at least in part, on timed metadata 110 stored in the database 105 (e.g., the timed metadata 110 may be stored in the database in a generic format that is not specific to a particular file format and the manifest file generator may generate an auxiliary manifest file in a given format based on querying the timed metadata 110 from the database 105). In one embodiment, the auxiliary manifest file 190 encodes timed metadata in a relatively simple serialization format such as JSON format or other well-known serialization format so that the timed metadata can be easily parsed from the auxiliary manifest file 190 and to make it easier to provide cross platform support. In one embodiment, some timed metadata can be included in the HTTP headers of the streaming manifest file. As will be described in additional detail below, the one or more auxiliary manifest files 190 (and more specifically, the timed metadata stored therein) can be used by a client device 130 to provide customized functionality that augments video playback (e.g., providing thumbnails for navigating a video and/or to identifying ad locations on a navigation bar).

As shown in the diagram, the client device 130 includes a media player application 140 and a core playback module 160. The media player application 140 may send a request to the server side (e.g., the media delivery system 100, a web server, a CDN, etc.) for a streaming manifest file 180. In response to the request, the server side may provide the media player application 140 with a streaming manifest file 180. In addition, the server side may also provide the media player application 140 with an auxiliary manifest file 190 (this could be responsive to the same request or a separate request (e.g., that is sent in parallel with the request for the streaming manifest file 180) (the streaming manifest file 180 and the auxiliary manifest file 190 could come from the same server or a different server)). While the diagram shows the client device 130 receiving the streaming manifest file 180 and the auxiliary manifest file 190 directly from the media delivery system 100, it should be understood that the client device 130 can receive these manifest files in a different way (e.g., from a web server or a CDN). In one embodiment, the media player application 140 may pass the streaming manifest file 180 to the core playback module 160 for video playback and pass the auxiliary manifest file 190 to a customized function module 150 to provide customized functionality using the timed metadata in the auxiliary manifest file 190. The core playback module 160 interprets the streaming manifest file 180 and plays video content according to the streaming manifest file 180. This may involve fetching, decoding, and playing video segments 195 referenced in the streaming manifest file 180. While the diagram shows the client device 130 receiving the video segments 195 directly from the media delivery system 100, it should be understood that the client device 130 can receive these manifest files in a different way (e.g., from a web server or a CDN). In one embodiment, the core playback module 160 may be compatible with HLS and/or DASH streaming protocols. The customized function module 150 provides custom functionality (e.g., that replaces or augments the functionality provided by the core playback module) using the timed metadata in the auxiliary manifest file 190. For example, the customized function module 150 may augment video playback with its own implementation of: 1) video navigation using thumbnails; 2) identifying ad locations; and/or 3) displaying user-generated content (e.g., annotations and/or comments associated with a particular playback position/range). For example, the customized function module 150 may use thumbnail information included in an auxiliary manifest file 190 to display a thumbnail on a display responsive to user input (e.g., user hovering their cursor over the navigation bar or performing a swiping gesture on a touch sensitive screen) to allow the user to navigate the video content. As another example, the customized function module 150 may use ad location information included in an auxiliary manifest file 190 to display ad locations on a navigation bar (e.g., by highlighting portions of the navigation bar that correspond to ads). As yet another example, the customized function module 150 may use user-generated content included in an auxiliary manifest file 190 to display annotations and comments generated by users (e.g., display annotations/comments when the current playback position is at a certain position or within a certain range). In some embodiments, the media player application 140 prevents certain operations (e.g., display of a navigation bar or seeking to a different location in the video content) until certain criteria is met (e.g., receipt of one or more of the auxiliary manifest files 190, and in some cases retrieval of some or all of the content identified by the timed metadata in the auxiliary manifest file 190 (e.g., retrieval of at least some or all of the thumbnails identified by the timed metadata in the auxiliary manifest file 190)). In the case of video content currently being broadcast (e.g., live TV), the media player application 140 may repeatedly request the streaming manifest file 180 as is known in the art, because additional data is being added to the streaming manifest file 180 as new video segments become available. In some embodiments, the same is done for at least one auxiliary manifest file 190. The core playback module 160 may inform the customized function module 150 regarding the current playback progress so that the customized function module 150 can be synchronized with the core playback module 160 (e.g., the core playback module may inform the customized function module 150 when specific points in the video timeline have been reached).

Although the client device 130 is shown as receiving a single auxiliary manifest file 190, it should be understood that the client device 130 can receive more than one auxiliary manifest file 190 (e.g., each having different types of timed metadata). Also, although the client device 130 is shown as having a single customized function module 150, it should be understood that the client device 130 can include more than one customized function module 150 (e.g., one for each type of auxiliary manifest file it may receive) to provide customized functionality utilizing different types of timed metadata.

Having a separate auxiliary manifest file 190 that includes timed metadata has several advantages. For example, while the code for processing streaming manifest files (e.g., the core playback module 160) must be able to handle the complexity of the streaming manifest files 180, the code for processing the auxiliary manifest file 190 (e.g., the customized function module 150) may be simpler since it only has to be able to perform the functionality that uses the timed metadata. As a result, the code for processing the auxiliary manifest file 190 is easier to develop/maintain for different platforms (sometimes referred to as cross-platform support) as compared to the code for processing the streaming manifest file 180.

In some cases, the core playback module 160 is developed/controlled by a first entity (e.g., the entity that develops/controls the client device platform and/or the entity that develops/controls the streaming protocol—as an example, Apple and Roku control the core playback modules found in the operating systems of their respective client device platforms such as Apple TV/iPad/iPhone/Mac and various Roku devices). In such cases, other entities developing media player applications 140 for a platform may effectively have to use the core playback module 160 installed in the client device 130 by the first entity (because the first entity may not allow other entities such as third-party developers to modify/configure the core playback module 160). Thus, even if a streaming manifest file 180 includes timed metadata, the other entities may have to rely on the functionality provided by the first entity's core playback module 160 to utilize that timed metadata. One way to circumvent this problem is for the other entities to develop media player applications 140 that extract the timed metadata from the streaming manifest file 180 before the streaming manifest file 180 is passed on to a core playback module 160. However, streaming manifest files 180 are typically very complex, and thus trying to extract timed metadata from a streaming manifest file 180 may be computationally expensive, which can waste precious computing resources of the client device 130. Having a separate auxiliary manifest file 190 that includes timed metadata allows the other entities to develop media player applications 140 that utilize timed metadata to provide custom functionality, without having to deal with the expense and complexity of extracting the timed metadata from a streaming manifest file 180.

Different embodiments may utilize auxiliary manifest files 190 for different purposes. For example, an auxiliary manifest file 190 may be used to identify the thumbnails used for navigating within a video content described by a streaming manifest file 180. While it is possible to include timed metadata within the streaming manifest file 180 itself to identify the thumbnails, this has the disadvantage that: 1) the core playback module 160 for one or more platforms may not support that aspect of the streaming manifest file 180; 2) the core playback module 160 for one or more platforms may not support using the thumbnails in a manner that is considered to provide the best user experience; and 3) the core playback module 160 for different platforms may implement the user interface for video navigation differently. Having a separate auxiliary manifest file 190 with timed metadata for thumbnails allows an application developer to develop their own code for performing video navigation operations that replaces or augments the functionality provided by the underlying playback module 160. As such, where such an auxiliary manifest file 190 is provided, the application developer can implement video navigation with thumbnails in a consistent manner across multiple platforms regardless of whether the timed metadata for thumbnails is present in the streaming manifest file 180, regardless of whether the core playback modules 160 on different platforms support this aspect of the streaming manifest file 190, and/or regardless of whether the core playback modules 160 on different platforms implement video navigation with thumbnails differently.

By way of another example, in some embodiments, an auxiliary manifest file 190 may be used to identify the location of advertisements (ads) in a video content described by a streaming manifest file 180. While it is possible to include timed metadata within the streaming manifest file 180 to identify ad locations, this has the disadvantage that: 1) the core playback module 160 for one or more platforms may not support that aspect of the streaming manifest file 180; 2) the core playback module 160 for one or more platforms may not support using the ad location information in a manner that is considered to provide the best user experience; and 3) the core playback module 160 for different platforms may implement the user interface that identifies the ad locations differently. Having a separate auxiliary manifest file 190 with timed metadata for identifying ad locations allows an application developer to develop their own code for displaying ad locations (e.g., on a navigation bar to allow a user to identify where the ads are located) that replaces or augments the functionality provided by the underlying playback module 160. As such, where such an auxiliary manifest file 190 is provided, the application developer can implement functionality to identify ad locations in a consistent manner across multiple platforms regardless of whether the timed metadata for identifying ad locations is present in the streaming manifest file 180, regardless of whether the core playback modules 160 on different platforms support this aspect of the streaming manifest file 180, and/or regardless of whether the core playback modules 160 on different platforms implement identifying ad locations differently.

While the examples of thumbnails and ad locations are discussed here, it should be understood that different embodiments may support other types of timed metadata and associated operations/functionality that utilize the timed metadata (e.g., displaying information about the actors on screen, displaying information about ads, displaying closed captions, and/or displaying user-generated content such as annotations and/or comments).

In some embodiments, multiple auxiliary manifest files 190 are provided, where each auxiliary manifest file 190 is for enabling a different feature/functionality. For example, assume that a first and second auxiliary manifest file 190 is provided for a first and second feature, respectively. Also, assume that the core playback module 160 on a first platform supports the first feature (based on using timed metadata included in the streaming manifest file 180), but not the second feature. In contrast, assume the core playback module 160 on a second platform does not support the first nor second features. In this case, the media player application 140 developed for the first platform may: 1) request the streaming manifest file 180 and provide it to the first platform's core playback module 160 for playback of the video content and provision of the first feature; and 2) request just the second auxiliary manifest file 190 for use by the media player application 140 (more specifically, a customized function module 150 of the media player application 140) to provide the second feature. In contrast, the media player application 140 developed for the second platform may: 1) request the streaming manifest file 180 and provide it to the second platform's core playback module 160 for playback of the video content; and 2) request both the first and second auxiliary manifest files 190 for use by the media player application 140 (more specifically, a first and second customized function module 150 of the media player application 140, respectively) to provide the first and second feature. Thus, the separation of auxiliary manifest files 190 for different features/functionality allows for the media player applications 140 developed for different platforms to request and process only the auxiliary manifest files 190 it needs. While in some embodiments there are separate auxiliary manifest files 190 corresponding to different features/functionality, alternative embodiments may implement the auxiliary manifest files 190 differently (e.g., have a single auxiliary manifest file 190 that includes timed metadata for all of the features/functionality that the media player applications 140 on different platforms may implement (even though the media player applications 140 for every one of these platforms may not necessarily implement all of the features) or have multiple auxiliary manifest files 190 that include timed metadata for a given set of features depending on what features the media player applications 140 on different platforms provide).

An exemplary auxiliary manifest file 190 for thumbnail information is shown below:

```
{
    "needs_refetch": true, // Is this live content?
    "refetch_interval": 12, // Time in seconds to wait before refetching
    "refetch_url": "http://www.philo.com/refetch-url/thumb.json", //
       Where to request the next one
    "url_to_thumbs": { // Hash of URL template to thumb spec
        "http://www.philo.com/live/thumb/4300000/$Time$.jpg": [
            { // Thumb spec
                "d": 4.004, // Duration
                "pt": 0, // Presentation time
                "ts": 623456304311 // PTS time of thumb, used to fill in
                    $Time$ in the template
            },
            {
                "d": 4.004,
                "pt": 4.004,
                "ts": 623456664671
            },
            {
                "d": 4.004,
                "pt": 8.008,
                "ts": 623457025031
            },
            {
                "d": 4.004,
                "pt": 12.012,
                "ts": 623457385391
            },
            {
                "d": 4.004,
                "pt": 16.016,
                "ts": 623457745751
            },
            {
                "d": 4.004,
                "pt": 20.02,
                "ts": 623458106111
            },
            {
                "d": 4.004,
                "pt": 24.024,
                "ts": 623458466471
            },
            {
                "d": 4.004,
                "pt": 28.028,
                "ts": 623458826831
            },
            {
                "d": 4.004,
                "pt": 32.032,
                "ts": 623459187191
            },
            {
                "d": 4.004,
                "pt": 36.036,
                "ts": 623459547551
            },
            {
                "d": 4.004,
                "pt": 40.04,
                "ts": 623459907911
            },
            {
                "d": 4.004,
                "pt": 44.044,
                "ts": 623460268271
            },
            {
                "d": 4.004,
                "pt": 48.048,
                "ts": 623460628631
            },
            {
                "d": 4.004,
                "pt": 52.052,
                "ts": 623460988991
            },
```
-continued
```
            {
                "d": 4.004,
                "pt": 56.056,
                "ts": 623461349351
            },
            {
                "d": 4.004,
                "pt": 60.06,
                "ts": 623461709711
            },
            {
                "d": 4.004,
                "pt": 64.064,
                "ts": 623462070071
            },
            {
                "d": 4.004,
                "pt": 68.068,
                "ts": 623462430431
            },
            {
                "d": 4.004,
                "pt": 72.072,
                "ts": 623462790791
            },
            {
                "d": 4.004,
                "pt": 76.076,
                "ts": 623463151151
            },
            {
                "d": 4.004,
                "pt": 80.08,
                "ts": 623463511511
            },
            {
                "d": 4.004,
                "pt": 84.084,
                "ts": 623463871871
            },
            {
                "d": 4.004,
                "pt": 88.088,
                "ts": 623464232231
            },
            {
                "d": 4.004,
                "pt": 92.092,
                "ts": 623464592591
            },
            {
                "d": 4.004,
                "pt": 96.096,
                "ts": 623464952951
            }
        ]
    }
}
```

An exemplary auxiliary manifest file 190 for ad location information is shown below:

```
{
    "ad_breaks": [
        {
            "end": 169.06404444444445, // ad end in presentation timeline
            "id": "sd-3689161",
            "start": 19.064044444444445 // ad start in presentation timeline
        }
    ],
    "availability_start_time": "2017-11-10T20:11:54.248Z", // UTC
        time corresponding with t=0 in presentation time
    "refetch_interval": 4,
    "refetch_url":
        "http://www.philo.com/manifest/live/manifest_meta.json",
```

-continued

```
   "segment_duration": 56.0453666665554, // Duration of segments
   available for this
session
    }
```

FIG. 2 is a flow diagram of a server side process, according to some embodiments. In one embodiment, the process is performed by an electronic device or a set of electronic devices that implement a media delivery system 100. The process can be implemented using software, hardware, firmware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 210, the media delivery system 100 generates a streaming manifest file 180 and an auxiliary manifest file 190, where the streaming manifest file 180 includes references to video segments of a video content, where the auxiliary manifest file 190 includes timed metadata associated with the video content, and where the streaming manifest file and the auxiliary manifest file refer to a same timeline. At block 220, the media delivery system 100 makes the streaming manifest file 180 and the auxiliary manifest file 190 accessible to a client device 130 (e.g., by sending these files to the client device 130 or storing these files in a CDN that is accessible to the client device 130).

Figure 3:
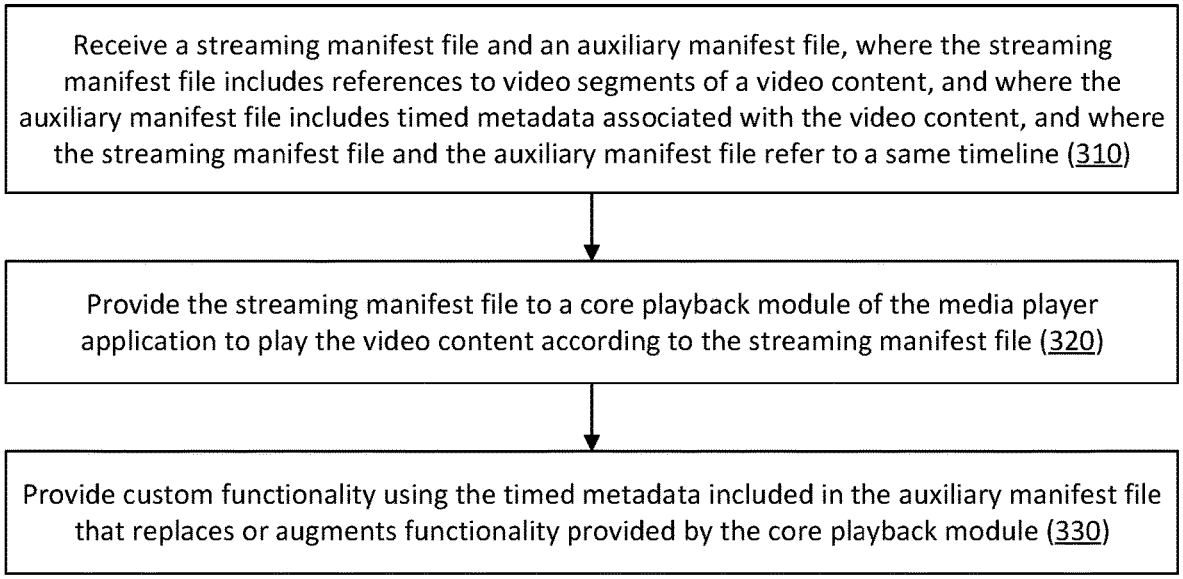
FIG. 3 is a flow diagram of a client side process, according to some embodiments.

FIG. 3 is a flow diagram of a client side process, according to some embodiments. In one embodiment, the process is performed by an electronic device such as a client device 130 executing a media player application 140. The process can be implemented using software, hardware, firmware, or any combination thereof.

At block 310, the client device 130 receives a streaming manifest file 180 and an auxiliary manifest file 190 (e.g., from a media delivery system 100 or CDN), where the streaming manifest file 180 includes references to video segments of a video content, where the auxiliary manifest files 190 includes timed metadata associated with the video content, and where the streaming manifest file and the auxiliary manifest files refer to a same timeline. At block 320, the client device 130 provides the streaming manifest file 180 to a core playback module 160 of the media player application to play the video content according to the streaming manifest file 180. At block 330, the client device 130 provides custom functionality using the timed metadata from the auxiliary manifest files 190 that replaces or augments functionality provided by the core playback module 160 (e.g., this could be achieved by providing the auxiliary manifest file 190 to a customized function module 150 of the media player application). In some embodiments, the client device 130 may receive more than one auxiliary manifest file 190 (e.g., each auxiliary manifest file including different type of metadata for enabling different features/functionalities) and provide custom functionality using the timed metadata from these auxiliary manifest files.

Figure 4:
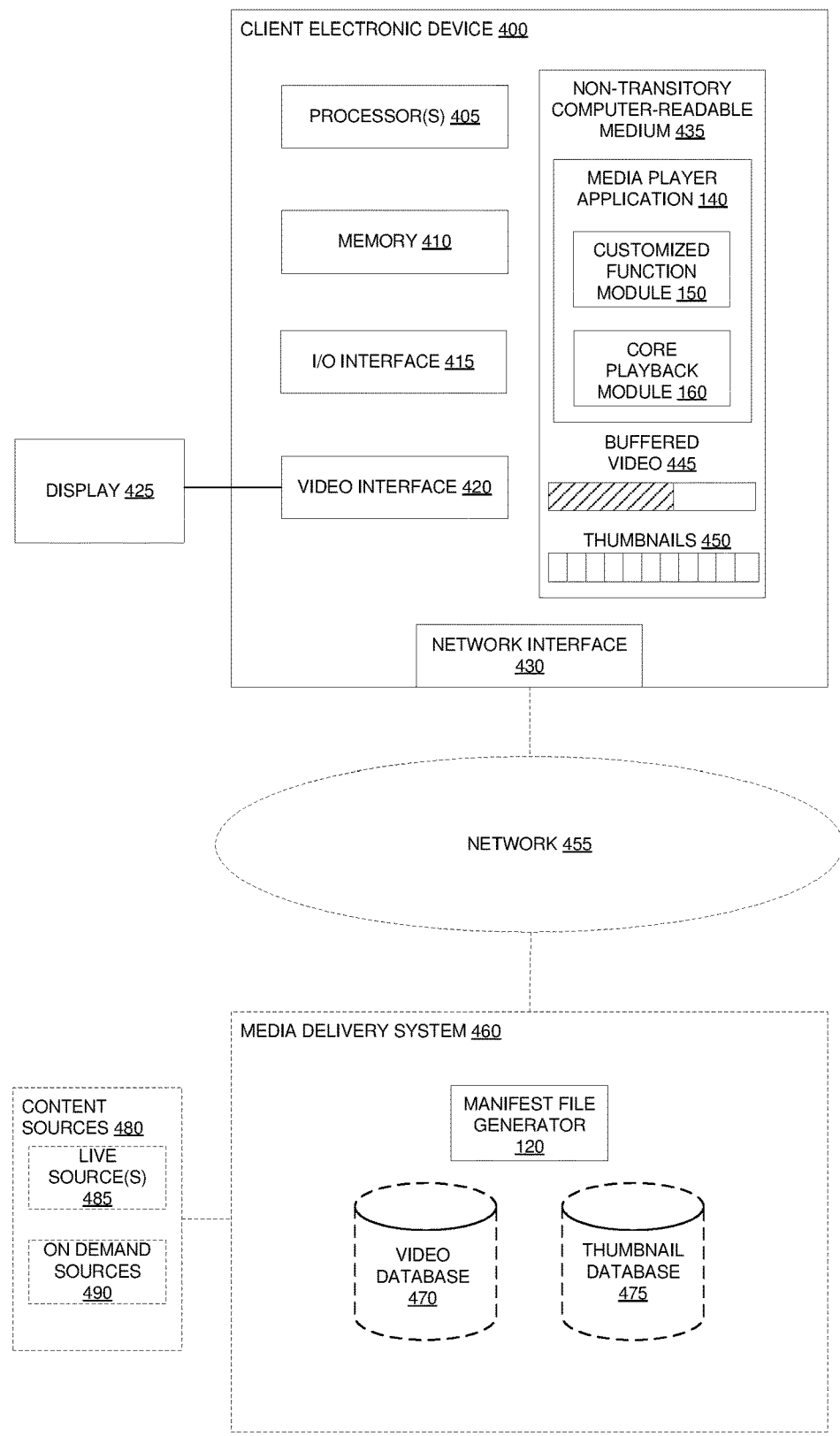
FIG. 4 is a block diagram illustrating a video streaming system, according to some embodiments.

FIG. 4 is a block diagram illustrating a video streaming system, according to some embodiments. The system includes a client electronic device 400 that is communicatively coupled to a media delivery system 460 over a network 455. In an embodiment, a client electronic device 400 is an electronic device that is able to request video content (also referred to simply as "video") from the media delivery system 460 and to play video content served by the media delivery system 460. The media delivery system 460 is a system configured to receive requests for video content from the client electronic device 400 and to serve the requested video content to the client electronic device 400. Although one client electronic device 400 is shown in FIG. 4, the system can include more than one client electronic device 400 and typically may include many separate client electronic devices 400. Furthermore, the media delivery system 460 can include additional components such as processors, storage servers, authentication servers, firewalls, and load balancers, which are not shown here for sake of clarity.

As shown in the diagram, the client electronic device 400 includes one or more processors 405, a memory 410, an input/output (I/O) interface 415, a video interface 420, a network interface 415, and a non-transitory computer-readable medium 435. The processors 405 may be, for example, general purpose microprocessors. The memory 410 may be a Random Access Memory (RAM) or other dynamic or volatile storage device for storing data and instructions to be executed by the processors 405. Memory 410 may also be used for storing temporary variables or other intermediate information during execution of instructions to be executed by the processors 405. Such instructions, when stored in the non-transitory computer-readable medium 435, render client electronic device 400 to be a special-purpose machine that is customized to perform the operations specified by the instructions.

In one embodiment, the non-transitory computer-readable medium 435 includes a core playback module 160 and a customized function module 150 that are included as part of a media player application 140. Media player application 140 may be an application that allows users to browse and play video accessible from a media delivery system 460. The core playback module 160 and the customized function module 150 may include code/instructions, that when executed by the processors 405, cause the client electronic device 400 to perform operations of one or more embodiments described herein.

The I/O interface 415 is configured to receive user input via an input device. The input device may be any type of device that can receive user input such as a keyboard, a mouse, a touchscreen panel affixed to a display, a trackpad, or a remote control. Other examples of suitable input devices include cameras, microphones, accelerometers, motion detectors, brain-machine interfaces, and/or other sensors.

The video interface 420 is communicatively coupled to a display 425 and is configured to output video content to the display 425. The display 425 may be any type of device that can display video content, the possible types of displays including, but not limited to, a television, a computer monitor, or a touchscreen display. While the display 425 is shown as being separate from the client electronic device 400, in some embodiments, the display 425 is integrated with the client electronic device 400.

The client electronic device 400 may be any type of device that can request and receive video content and can output video content to a display 425. For example, a client electronic device 400 can comprise a mobile device, a tablet computer, a desktop computer, a set-top box (STB), a smart TV, a video game console, a digital media player, a digital versatile disk (DVD) player, or a Blu-Ray player.

The data network 455 can be any type of network capable of transporting data from one device to another device (for example, from a client electronic device 400 to media delivery system 460 and from media delivery system 460 to one or more client electronic devices 400). For example, the data network 455 can include any combination of the internet, a Wide Area Network (WAN), a Local Area Network (LAN), a cellular communications network, a telephone network, a terrestrial analog or digital signal system, a cable system, and a satellite communications system.

The media delivery system 460 includes a video database 470 and a thumbnail database 475 (e.g., each of which can be a file system, key value store, relational database, or any other suitable storage means). In an embodiment, the media delivery system 460 can be implemented across any number of hardware devices and platforms in a distributed manner. In an embodiment, the media delivery system 460 ingests video content from content sources 480, such as one or more live content source(s) 485 (for example, live linear programming from one or more broadcast sources), one or more on demand content sources 490 (for example, one or more video-on-demand (VOD) content services), or both, and stores some or all of the ingested video content in the video database 470 to be served to client electronic devices 400. The media delivery system 460 may store thumbnails for some or all of the ingested video content in the thumbnail database 475. For example, video content items (for example, television episodes, movies, VOD programs, and so forth) stored in the video database 470 may be associated with corresponding sets of thumbnails. In an embodiment, the set of thumbnails associated with a video content item can include thumbnails where each thumbnail is associated with a particular time position in the video content. For example, the set of thumbnails for a particular video content item might include a thumbnail for every five (5) second increment in the video content. More granular or less granular thumbnail increments are also possible. In one embodiment, the media delivery system 460 includes a manifest file generator 120 that can generate streaming manifest files 180 and auxiliary manifest files 190, as described herein. The manifest file generator component 120 may be implemented using software, hardware, firmware, or any combination thereof.

In an embodiment, certain components of the media delivery system 460 can be implemented in full or in part using "cloud"-based components that are coupled to the systems by one or more networks, such as the internet. The cloud-based components may expose interfaces by which they provide processing, storage, software, and/or other resources to other components of the systems. In an embodiment, the cloud-based components may be implemented by third-party entities on behalf of another entity for whom the components are deployed. In other embodiments, the described systems may be implemented entirely by computer systems owned and operated by a single entity.

During operation of the system, a client electronic device 400 may generate and transmit one or more requests to the media delivery system 460 to play or otherwise access particular video content items. In response to receiving such requests, the media delivery system 460 may serve the requested video content items to the client electronic devices 400. This may involve transmitting video content stored in the video database 470, as well as thumbnails associated with the video content stored in the thumbnail database 475, to the client electronic devices 400 over the network 455. The client electronic devices 400 may buffer a portion of the received video content (e.g., buffered video 445) in the non-transitory machine-readable medium 435 and output the buffered video content to the display 425. In one embodiment, the client device 400 buffers a threshold amount of video content following (and preceding) the user's current viewing position in the video (e.g., buffered video 445). The client electronic device 400 may also store some or all of the thumbnails 450 for the video in the non-transitory machine-readable medium 435. Each thumbnail is associated with a time position in the video. The client device 400 may use the thumbnails 450 to generate and output (to the display 425) a GUI that allows a user to navigate a video.

FIG. 5 is a diagram illustrating a video streaming system architecture, according to some embodiments. In an embodiment, the system of FIG. 5 includes content sources 480, an encoder/packager 510, a media delivery system 460, an ad server 525, a programmer ad decision engine 530, a Digital Rights Management (DRM) server 570, a Content Distribution Network (CDN) 575, and client electronic devices 400. The encoder/packager 510 includes a processing component 515 and an encoding component 520. The media delivery system 460 includes an intermediate packaging component 540, a final packaging component 555, a stitching component 560, and an ad decisions component 565.

The content sources 480 provide video content that is to be consumed by users. The video content can include live content, VOD content, and/or any other type of video content.

The encoder/packager 510 ingests video content from the content sources 480. For example, the encoder/packager 510 can ingest live video content picked up from a signal of a live linear cable network—national or local, where appropriate and agreed upon. As another example, the encoder/packager 510 can ingest VOD content directly from the programmer itself or via a content aggregation partner. In one embodiment, the encoder/packager 510 may ingest video content via satellite or terrestrial means. In one embodiment, the encoder/packager 510 receives Society of Cable and Telecommunications Engineers 35 2013 (SCTE-35) markers in a data Program Information Description (PID) along with the video content. SCTE-35 can be used to signal ad insertion opportunities in the transport stream, which can be used for Dynamic Ad Insertion (DAI). In one embodiment, the encoder/packager 510 receives Nielsen audience measurement tags in a data PID, or embedded in the audio stream. The Nielsen audience measurement tags can be used to measure audience size and demographic information. The processing component 515 of the encoder/packager 510 processes the SCTE-35 markers and the Nielsen audience measurement tags as well as any Closed Captioning (CC) and Second Audio Programming (SAP)/Descriptive Video Service (DVS) information.

In one embodiment, the encoding component 520 of the encoder/packager 510 transcodes the video content into multiple bitrates (for example, into several Adaptive Bitrate (ABR) profiles) and places key frames at ad boundaries as informed by the SCTE-35 data. The packager segments the content according to the keyframes placed by the transcoder and encrypts the content for transport (for example, using Advanced Encryption Standard (AES) encryption). In one embodiment, the video is packaged using the Hypertext Transfer Protocol (HTTP) Live Streaming (HLS) protocol with AES encryption and the HLS-encoded video is provided to the media delivery system 460 (for example, over a private network connection).

In one embodiment, the intermediate packaging component 540 of the media delivery system 460 decrypts the received video content, repackages the video content to an intermediate format (for example, using fragmented MPEG-4 (fMP4) or any other video streaming format), encrypts the repackaged video (for example, using MPEG Common Encryption (MPEG-CENC)), and stores the encrypted video segments in a distributed storage layer 545, which serves as the origin for the content distribution network (CDN). In general, the intermediate packaging component 540 can repackage and store the video in any intermediate file format suitable for transfer to a CDN, directly to client devices, or both. In one embodiment, to provide low-latency access to live content, the media delivery system can act as a fall back origin for the CDN in case the video segments are requested before they have been permanently stored in the distributed storage layer 545. When a client electronic device 400 requests a video, the video segments can be repackaged on the fly (just-in-time repackaging) into the appropriate output format. In other embodiments, the video content ingested from content sources 480 can be stored in its original format (e.g., HLS) without conversion.

In one embodiment, the distributed storage layer 545 is provided using a cloud-based storage service. Also, the intermediate packaging component 540 may store relevant metadata for the video (for example, timestamps and SCTE-35 markers) in a metadata database 550 (for example, a relational database or other data storage application). In one embodiment, the metadata includes some or all of: information related to ad positions, ad insertion information, information related to thumbnail image files such as their associated time positions in the video (the thumbnails themselves may be stored in distributed storage layer 545—for example, stored in JPG or PNG format), and user-generated content (e.g., annotations and/or comments). In an embodiment, metadata database corresponds to database 105 and stores timed metadata. For live video, the metadata may include GIF preview animations showing the most recent video (the most recent 15 seconds, for example). In one embodiment, the thumbnails are cached in one or more Content Distribution Networks (CDNs) to be served to clients.

In one embodiment, the media delivery system 460 ingests mezzanine VOD assets from a programmer via a secure Internet Protocol (IP) connection. The VOD assets may then be processed using a job-based workflow. In one embodiment, the metadata for the VOD assets are ingested and stored in the metadata database 550 while the mezzanine files are transcoded to fMP4 with CENC and stored in the distributed storage layer 545.

The final packaging component 555 of the media delivery system 460 reads the encrypted video segments, decrypts the segments, optionally repackages the segments, and then re-encrypts the segments to the proper format. In one embodiment, the re-encrypted formats include HLS with FairPlay Digital Rights Management (DRM), Dynamic Adaptive Streaming over HTTP (DASH) with WideVine/PlayReady CENC DRM, or both. The final packaging component 555 passes through any ID3 tags for Nielsen measurements and communicates with the DRM server 570 (which manages content license keys) to ensure that all content is encrypted with up-to-date keys. The final video segments are cached in one or more CDNs 575 to be served to client electronic devices 400.

The stitching component 560 of the media delivery system 460 generates client-specific manifests on the fly (just-in-time manifest creation to allow for fine-grained control over the video stream and the end-user experience—for example, just-in-time manifest creation may allow for performing DAI that is personalized for the end-user and/or for tweaking the start/end time of a show (e.g., when recording a live event, it may not be possible to know exactly when the show starts—if a human marks when the show starts, this information can be dynamically added to the manifest)). The stitching component 560 can generate manifests for HLS, DASH, or any manifest format suitable for the client electronic devices 400. The manifests may be generated based on the metadata stored in the metadata database 550. In one embodiment, the stitching component 560 includes a manifest file generator 120, which generates streaming manifest files 180 and auxiliary manifest files 190, as described herein. In other embodiments, the manifest file generator 120 may be separate from the stitching component 560. Also, the stitching component 560 may drive DAI using a programmer ad decision engine 530. For example, the stitching component 560 may send a request to the ad decisions component 565 for ads to be dynamically inserted into a video. The ad decisions component 565 processes the dynamic ad request in concert with a third-party ad decision engine such as the programmer ad decision engine 530 and provides an indication of the ads to be inserted into the video. The stitching component 560 may then make a request to the final packaging component 555 to insert the ads. When a client ad pod is upcoming, the final packaging component 555 of the media delivery system 460 may request the ads from the ad server 525 to fill the ad pod, transcode the ads, apply DRM to the ads (because some platforms cannot play encrypted content followed by unencrypted content), and cache the ads (e.g., if the ads have not already been stored/cached). The stitching component 560 may check the metadata database 550 to determine whether the ads have been ingested. If the ads have been ingested, the stitching component 560 may insert the metadata for the ads into the manifest. If the ads have not been ingested, then the stitching component 560 may ask another component/system to do so. The stitching component 560 serves the manifest that refers to the freshly transcoded ad pod video segments.

In an embodiment, client electronic devices 400 include a media player application (for example, a media player application 140) capable of playing streaming video (for example, video content in HLS with FairPlay format or DASH with WideVine/CENC format). When the user selects a video to watch, the client electronic device 400 requests a manifest for the selected video (e.g., a streaming manifest file) from the stitching component 560 (and possibly one or more auxiliary manifest files 190). In one embodiment, this request is made over HTTP Secure (HTTPS). If the user is not currently streaming more concurrent streams than they are allowed (for example, as determined by the stitching component 560 or another component of the media delivery system 460), then the stitching component 560 generates a manifest that is specific for the client electronic device 400 and sends the manifest to the client electronic device 400 (e.g., this could include a streaming manifest file 180 and one or more auxiliary manifest files 190). The client electronic device 400 may then begin fetching encrypted video segments from the CDN 575 according to the manifest (the streaming manifest file). In one embodiment, the client electronic device 400 may use timed metadata included in an auxiliary manifest file 190 to provide custom functionality, as described herein. In one embodiment, the encrypted video segments are fetched from the CDN 575 over HTTPS. The content can be fetched from the CDN 575 over a public network such as the internet and thus may travel across a variety of networks.

The media delivery system 460 shown in FIG. 5 may report audience measurement data to Nielsen (or other entities that gather audience measurement data) based on metadata embedded in the video segments. Client electronic devices 400 may have access to a Nielsen Software Development Kit (SDK) library that enables the client electronic devices 400 to report audience measurement data or other software to implement similar functionality.

In one embodiment, the media delivery system 460 shown in FIG. 5 supports the ability to enforce content viewing rules and restrictions according to agreements made with content programmers. For example, these content viewing rules and restrictions may include supporting content blackouts (based on location or device) or content substitutions. In one embodiment, the media delivery system 460 periodically pulls blackout information from programmers (for example, via agreed upon methods and timeframes). Additionally or alternatively, in one embodiment, the video streaming platform allows programmers to push blackout updates to the media delivery system 460 through a cloud-hosted and secure Representational State Transfer (REST) Application Programming Interface (API) (for example, that adheres to SCTE-224). In one embodiment, the video streaming platform can accept blackout information in-band via SCTE-35. In one embodiment, blackout information can include information indicating one or more channels to be blacked out, a zip code to be blacked out, device type(s) to be blacked out, a time period for the blackout, or any combination thereof. The backend of the media delivery system 460 may integrate with a geofencing library that maps client IP addresses to zip codes, which allows the video streaming platform to prevent or stop playback of video content as needed. This process may integrate with the stitching component 560 or another component of the media delivery system 460 so that custom slates can be inserted during blackouts as needed. In one embodiment, blackouts are instead indicated as part of program guide data or other metadata provided to the client electronic device 400, for example, via a separate API, allowing the client electronic device 400 to prevent playback of a blacked-out program It should be understood that the particular division of functionality between the various system components shown in FIG. 5 is purely exemplary and is not intended to be limiting. Functions performed by a single system component may instead be performed by multiple system components and functions performed by multiple system components may instead be performed by a single system component.

An embodiment may be an article of manufacture in which a non-transitory computer-readable medium (such as microelectronic memory) has stored thereon instructions (e.g., computer code) which program one or more data processing components (generically referred to here as a "processor") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the several embodiments have described, those skilled in the art will recognize that the techniques described herein are not limited to the embodiments described, but can be practiced with modification and alteration within the spirit and scope of the appended claims. The description is thus to be regarded as illustrative instead of limiting.

What is claimed is:

1. A method by a media delivery system, comprising:
generating a streaming manifest file and a first auxiliary manifest file, wherein the streaming manifest file includes references to video segments of a video content, wherein the first auxiliary manifest file includes timed metadata associated with the video content, and wherein the streaming manifest file and the first auxiliary manifest file refer to a same timeline;
providing the streaming manifest file to client devices that belong to different client device platforms and that will playback the video content through processing the streaming manifest file with a respective core player developed for that client device platform, wherein the different client device platforms are controlled by different entities; and
providing the timed metadata using the first auxiliary manifest file to the client devices that belong to the different client device platforms and that will augment the playback of the video content through processing the timed metadata with a respective custom functionality module developed for that client device platform, wherein the respective custom functionality modules developed for the different client device platforms are all controlled by a single entity that provides the augmented video content playback across the different client device platforms.

2. The method of claim 1, wherein the timed metadata included in the first auxiliary manifest file includes any one of thumbnail information, ad location information, information about actors on screen, closed caption information, and user-generated content.

3. The method of claim 1, further comprising:
generating a second auxiliary manifest file and providing the second auxiliary manifest file to the client devices that belong to different client device platforms, wherein the second auxiliary manifest file includes a different type of timed metadata associated with the video content from the type of timed metadata included in the first auxiliary manifest file.

4. The method of claim 1, wherein the first auxiliary manifest file is provided to the client devices via a content delivery network (CDN).

5. A non-transitory computer-readable medium having stored therein instructions, which when executed by one or more processors of an electronic device implementing a media delivery system, causes the electronic device to perform operations comprising:
generating a streaming manifest file and a first auxiliary manifest file, wherein the streaming manifest file includes references to video segments of a video content, wherein the first auxiliary manifest file includes timed metadata associated with the video content, and wherein the streaming manifest file and the first auxiliary manifest file refer to a same timeline;
providing the streaming manifest file to client devices that belong to different client device platforms and that will playback the video content through processing the streaming manifest file with a respective core player developed for that client device platform, wherein the different client device platforms are controlled by different entities; and
providing the timed metadata using the first auxiliary manifest file to the client devices that belong to the different client device platforms and that will augment the playback of the video content through processing the timed metadata with a respective custom functionality module developed for that client device platform, wherein the respective custom functionality modules developed for the different client device platforms are all controlled by a single entity that provides the augmented video content playback across the different client device platforms.

6. A non-transitory computer-readable medium of claim 5, wherein the timed metadata included in the first auxiliary manifest file includes any one of thumbnail information, ad location information, information about actors on screen, closed caption information, and user-generated content.

7. The non-transitory computer-readable medium of claim 5, wherein the instructions, when executed by the one or more processors of the electronic device, causes the electronic device to perform further operations comprising:
   generating a second auxiliary manifest file and providing the second auxiliary manifest file to the client devices that belong to different client device platforms, wherein the second auxiliary manifest file includes a different type of timed metadata associated with the video content from the type of timed metadata included in the first auxiliary manifest file.

8. The non-transitory computer-readable medium of claim 5, wherein the first auxiliary manifest file is provided to the client devices via a content delivery network (CDN).

* * * * *